Nov. 30, 1943.    G. T. RANDOL    2,335,444
CONTROL MECHANISM FOR CHANGE SPEED GEARING
Original Filed April 6, 1939    3 Sheets-Sheet 1
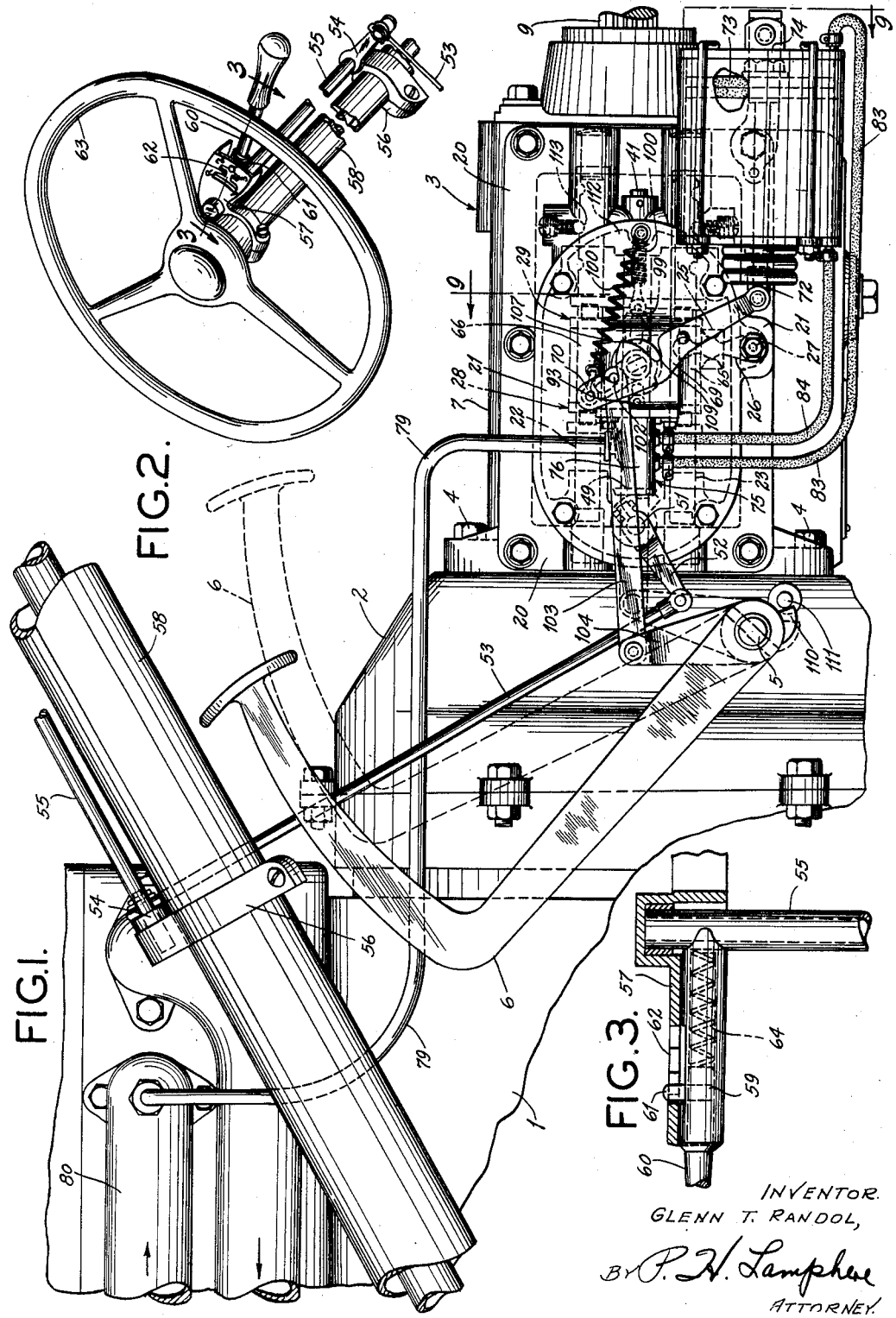
INVENTOR.
GLENN T. RANDOL,
BY P. H. Lamphere
ATTORNEY.

Nov. 30, 1943.  G. T. RANDOL  2,335,444
CONTROL MECHANISM FOR CHANGE SPEED GEARING
Original Filed April 6, 1939  3 Sheets-Sheet 2
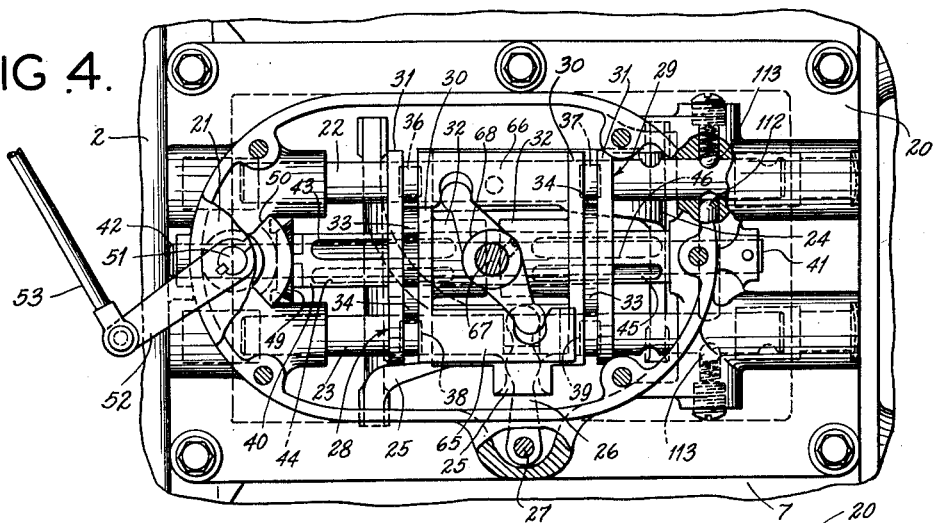
FIG. 4.
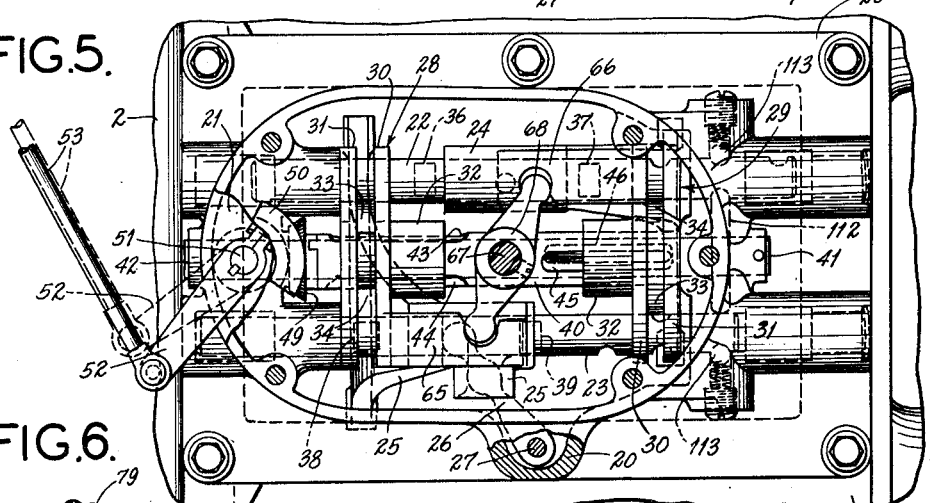
FIG. 5.
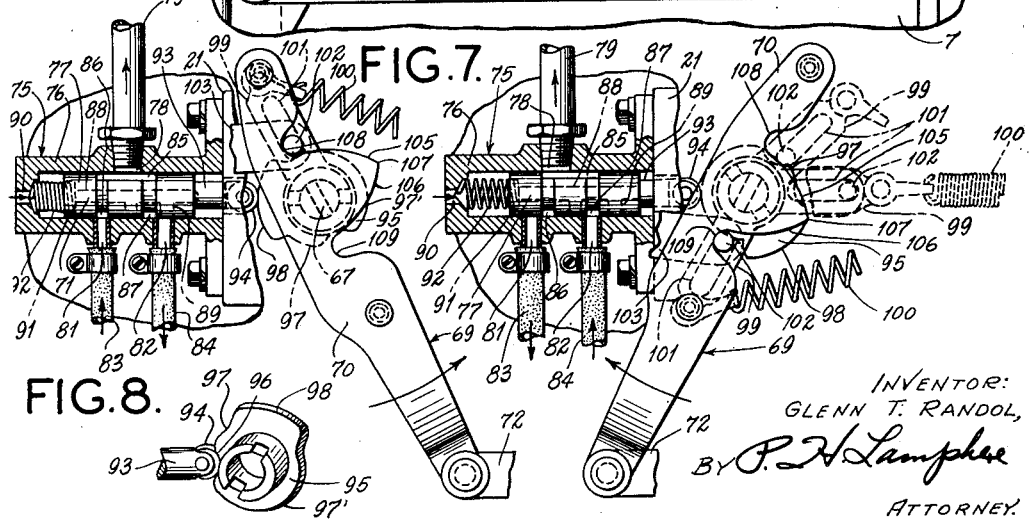
FIG. 6.  FIG. 7.
FIG. 8.
INVENTOR:
GLENN T. RANDOL,
By P. H. Lamphere
ATTORNEY.

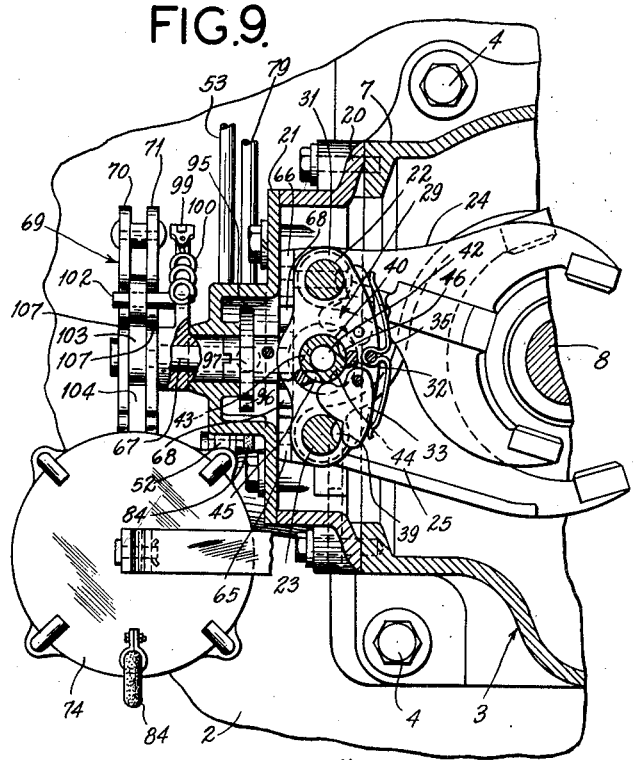
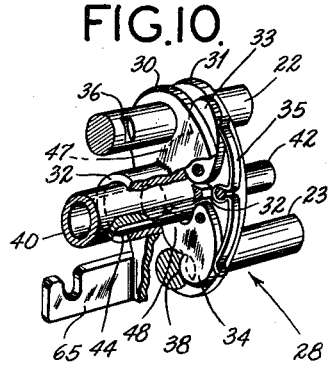
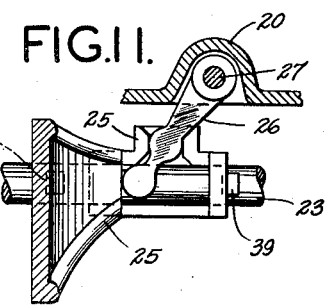
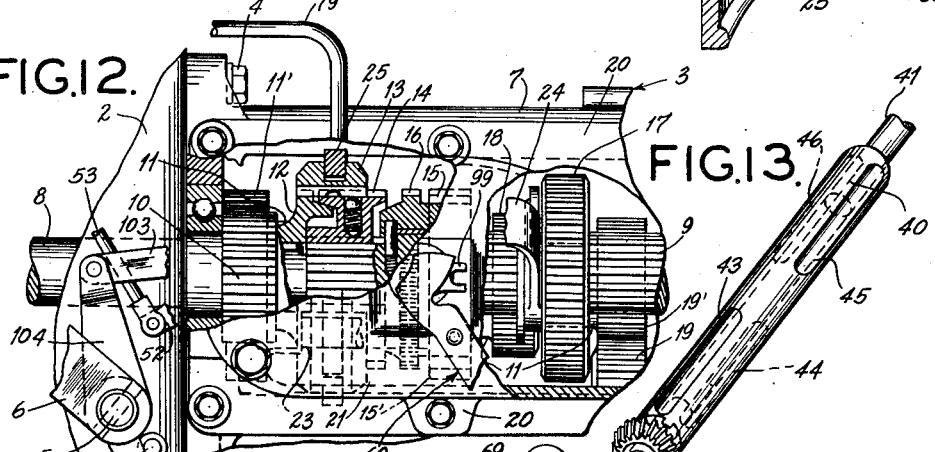

Patented Nov. 30, 1943

2,335,444

UNITED STATES PATENT OFFICE 2,335,444

CONTROL MECHANISM FOR CHANGE-SPEED GEARING

Glenn T. Randol, St. Louis, Mo., assignor to William M. Liddon, Nashville, Tenn.

Original application April 6, 1939, Serial No. 266,348. Divided and this application September 10, 1941, Serial No. 410,248

6 Claims. (Cl. 74—473)

My invention relates to change speed gearing and more particularly to mechanism for selecting and shifting the elements controlling the different speed ratios thereof.

This is a divisional application of my copending application Serial No. 266,348, filed April 6, 1939, for Control mechanism for change speed gearing, which matured into Patent No. 2,258,068 dated October 7, 1941, and is directed to the selecting and shifting mechanism associated with the shifting forks and mounted within the gearing housing.

One of the objects of my invention is to provide improved means for selectively connecting the shifting forks of a change speed gearing to the mechanism for performing the shifting of said forks whereby unrestricted selection of the forks may be accomplished.

Another object of my invention is to provide means in a gear shifting mechanism whereby the member for performing the shifting will have a uniform distance of travel to accomplish the shifting of each of the elements of the gearing, notwithstanding said elements must be moved different distances to be placed in an operative position.

Other objects of my invention will become apparent from the following description taken in connection with the accompanying drawings in which Figure 1 is a side view of a portion of a motor vehicle power plant showing a change speed gearing provided with a shifting mechanism therefor embodying my invention; Figure 2 is a perspective view of the hand selecting mechanism mounted on the steering column of the vehicle; Figure 3 is a cross-sectional view taken on the line 3—3 of Figure 2; Figure 4 is a view of the mechanism within the gearing housing with the cover removed and showing the parts thereof in their respective positions when the gearing is in neutral; Figure 5 is a view similar to Figure 4 but showing the parts in the positions they assume when the gearing is in high speed ratio; Figure 6 is a partial cross-sectional view of the control valve and related parts showing their positions when the gearing is in neutral; Figure 7 is a view similar to Figure 6 but showing the control valve and related parts in the positions they assume when the gearing is in high speed ratio condition; Figure 8 is a perspective view of the control cam for the valve; Figure 9 is a cross-sectional view taken on the line 9—9 of Figure 1; Figure 10 is a perspective view of one of the companion shifting yokes for selectively operating the shifting forks; Figure 11 is a view showing the lever connection between high and second speed shifting forks and the carrying rail; Figure 12 is a view, parts being shown in section, of a portion of the change speed gearing showing it in high gear position; Figure 13 is a perspective view of the rotatable selector control member for controlling the connecting pawls on the shifting yokes; and Figure 14 is a view similar to Figure 7 but showing the valve and related parts in the positions they assume when the valve is shut off and the clutch pedal is in clutch-engaged position.

Referring to the drawings in detail, and particularly to Figure 1, numeral 1 indicates the internal combustion engine of a motor vehicle which is connected by means of the usual clutch 2 to the change speed gearing 3 whereby the driven shaft 9 of the gearing may be rotated at different speed ratios to drive the wheels of the vehicle through the propeller shaft (not shown). The clutch 2 is of conventional construction and the disengageable elements thereof are controlled by a shaft 5 extending to the exterior of the clutch housing and having a clutch pedal 6 secured thereto to be actuated by a foot of the operator of the vehicle. The change speed gearing 3 with which my improved control mechanism is associated is also of conventional design and is enclosed within the gearing housing 7 secured to the clutch housing by bolts 4. Since this gearing forms no part of my invention, it is not disclosed in detail. However, in Figure 12 I have disclosed a portion of this gearing in order to better show how it is controlled by my improved mechanism.

Referring to Figure 12, the driving shaft 8 of the transmission leading from the clutch has aligned therewith the driven shaft 9 connected in a suitable manner with the propeller shaft. The inner end of shaft 8 has secured thereto a gear 10 which constantly drives a counter-shaft 11 by means of a gear 11' in mesh with gear 10. The gear 10 is provided with clutch teeth 12 which cooperate with a slidable clutch element 13 splined to a member 14 secured to the driven shaft 9. The driven shaft 9 also has rotatably mounted thereon a gear 15, this gearing being constantly driven by a gear 15' on the counter-shaft (not shown). The gear 15 is provided with clutch teeth 16 which also cooperate with the slidable clutch element 13. Thus when the clutch element is in the position shown in Figure 12, shaft 8 will be directly connected to shaft 9 and high or direct speed ratio will be operative. If the clutch element is moved to the right so that it engages the clutch teeth 16, gear 15 will be connected to the driven shaft 9 and second speed ratio will be operative. The driven shaft 9 has slidably splined thereon a gear 17 which is slidable in the forward direction to engage with a gear 18 driven by the counter-shaft for securing low speed ratio and slidable rearwardly to engage with an idler gear 19 driven by means of a gear 19' on the counter-shaft to thus secure reverse speed ratio.

In accordance with my invention, I detachably mount upon the housing 7, a supporting housing 20 and a cover 21. The supporting housing 20 has slidably mounted thereon parallel rods 22 and 23 and secured to rod 22 is a shifting fork 24 which controls the gear 17 for the low and reverse speed ratios of the change speed gearing. The rod 23 has loosely mounted thereon a shifting fork 25 which cooperates with the sliding clutch element 13 (Figure 12) for shifting this clutch element to cause the high and second speed ratios to be operative and inoperative as desired. In the type of change speed gearing shown, the shifting fork 25 for moving clutch element 13 need not be shifted as far in either direction as the gear shifting fork 24 for moving gear 17. It is desirable, however, that rods 22 and 23 be moved equal distances in shifting the shifting forks. Therefore, in order that the shifting fork 25 may be moved a shorter distance than the shifting fork 24 for the same movement of either rod 23 or 22, I provide an arm 26 which is pivotally connected at 27 to the supporting housing 20 and also with shifting fork 25 and rod 23. The connection between the arm and the shifting fork is at a point closer to pivot 27 than the connection between the arm and rod 23. Therefore, as the rod is moved in either direction from a central position, as shown in Figure 5, the arm will cause shifting fork 25 to move a distance less than the distance which rod 23 will move.

Rods 22 and 23 have mounted thereon companion connecting devices 28 and 29 for connecting the rods to a single member to perform the shifting of the forks. The device 28 and the rods are shown in detail in Figure 10. Each of these devices 28 and 29 comprises two spaced plates 30 and 31 having openings therein for receiving rods 22 and 23 and these plates have welded thereto a tubular member 32 which lies between the rods. The plates 30 and 31 have pivotally mounted therebetween two detents 33 and 34 which are spring-biased toward the rods by means of a single leaf spring 35. The rod 22 has cut therein on its underside spaced slots 36 and 37 and rod 23 has similar slots 38 and 39. The detent 34 in the connecting device 28 is adapted to cooperate with slot 38 in rod 23 and detent 33 of this same device cooperates with slot 36 in rod 22. The detent 34 of the connecting device 29 cooperates with slot 37 in rod 22 and detent 33 of this device cooperates with slot 39 in rod 23.

The two tubular portions 32 of the companion connecting devices are aligned and receive a rotatable selector control member 40 journaled on stub-shafts 41 and 42 in the ends of the supporting member 20. The outer surface of this selector member is provided with elongated recesses 43, 44, 45 and 46, the former two being in one end of the member and in circumferentially spaced relation and the latter two being in the other end of the member and also in circumferentially spaced relation. The recesses 43 and 44 cooperate with detents 33 and 34, respectively, on the device 28 and recesses 45 and 46 cooperate with detents 33 and 34, respectively, on device 29. The detents 33 and 34 are provided with projecting portions 47 and 48 which extend through slots in the tubular member 32 whereby the detents may be properly controlled by the recesses in the selector control member 40.

The control member 40 has operatively connected thereto a bevel gear 49 which meshes with a gear 50 carried by a shaft 51 mounted in cover 21. The outer end of this shaft has secured thereto a lever 52, and a rod 53 connects this lever to a lever 54 on the end of a shaft 55 rotatably mounted in the brackets 56 and 57 on the steering column 58. The upper end of shaft 55 has secured thereto a tubular arm 59 and slidable therein is a hand lever 60. This lever carries a pin 61 which projects upwardly into an H-slot 62 in the top of the bracket 57 which is positioned just below the steering wheel 63. The surface of the bracket carries suitable indicia "R", "1", "2", and "3" in order to designate the different legs of the H-slot whereby the operator will have knowledge of which speed ratio is selected when pin 61 is placed in the end of a particular slot. The lever 60 is normally biased by a spring 64 to a position where pin 61 is in a slight recess in the end of the cross-over slot and in alignment with the slots designated "2" and "3".

From the previously described structure it is apparent that the shifting forks 24 and 25 may be selectively connected to either of the companion connecting devices 28 and 29 as desired. Thus, if the hand lever 60 is pushed inwardly and pulled downwardly so that pin 61 assumes a position at the end of the slot marked "1", the rotatable control member 40 will be rotated to such a position that the projecting portion 47 on detent 33 of device 28 will be biased into the elongated recess 43, thereby permitting the detent to engage in slot 36 in rod 22, and connect the shifting fork 24 to device 28.

If lever 60 is moved out of the end of the slot "1" and into the end of slot "2", this will cause the rotatable control member 40 to assume a position where the projection 47 on detent 33 of device 29 will be biased into the elongated recess 45, thereby permitting the detent 33 to engage in slot 39 on rod 23, thus connecting the device 29 with rod 23.

If lever 60 should be moved downwardly so that pin 61 is in the end of the slot marked "3", the rotatable control member 40 will assume a position where projection 48 on detent 34 of device 28 will be biased into the elongated recess 44, thereby permitting detent 34 to engage in slot 38 to connect device 28 to the rod 23.

If lever 60 should be moved so that pin 61 is at the end of the slot marked "R", the rotatable control member 40 will be moved to a position where projection 48 on detent 34 of device 29 will be biased into elongated recess 46 and thereby permit detent 34 to engage in slot 37 of rod 22 to connect device 29 to said rod.

In order to prevent the movement of rods 22 and 23 when one is moved to operative position, there is provided the usual interlock device 112. Detent devices 113 maintain the rods in their different positions.

In order that the devices 28 and 29 may be moved in opposite directions from and to their neutral positions, as shown in Figure 4, to move the shifting forks and the gearing elements connected thereto to operative and inoperative positions, respectively, plate 30 of the device 28 is provided with a projecting portion 65 overlying the gearing shifting fork 25, and plate 30 of device 29 is provided with a projecting portion 66 overlying the shifting fork 24. Journaled in cover 21 is a shaft 67 which extends to a point between projections 65 and 66 and upon the end of this shaft is secured a double arm lever 68, one arm of which is pivotally connected to projection 65 and the other arm to projection 66. It is thus seen that if shaft 67 is rotated in a clockwise direction from the position shown in Figure 4, devices 28 and 29 will be moved outwardly to the positions shown in Figure 5 and return rotation of the shaft will cause the devices to be returned to their neutral or inoperative positions.

The outer end of shaft 67 has secured thereto a lever 69 formed of two spaced members 70 and 71 riveted together. The lower arm of this lever is pivotally connected to a piston rod 72 operated by a piston 73 reciprocable in a cylinder 74 secured to the side of the gearing housing, said piston and cylinder forming a suction motor or power cylinder for rotating shaft 67.

In order that the suction motor may be properly controlled, I provide a valve 75 mounted upon cover 21, this valve comprising a cylindrical valve casing 76 and a valve element 77 slidable in the casing. One side of the casing is provided with a port 78 which is connected by means of a conduit 79 to the intake manifold 80 of the internal combustion engine, this intake manifold serving as the source of suction for operating the suction motor. The opposite side of the valve casing 76 is provided with spaced ports 81 and 82, the former being connected by a conduit 83 to the rear end of the suction motor cylinder 74 and the latter connected by a conduit 84 to the forward end of said cylinder.

The slidable valve element is provided with an elongated recess 85 in constant communication with port 78 and communicating with this recess are grooves 86 and 87 for cooperation with ports 81 and 82, respectively. The valve element is also provided with a central bore 88 and a passage 89 for connecting the port 82 to atmosphere by means of the opening 90 in the ends of the valve casing. A passage 91 is provided for connecting port 81 to atmosphere. The valve element is normally biased by means of a spring 92 to a position where ports 81 and 82 are in communication with atmosphere as shown in Figure 14.

The valve element 77 is operated by means of a stem 93 which extends into cover 21 and is provided with a roller 94 for cooperation with a cam 95 rotatably mounted upon shaft 67. The surface of this cam is provided with a recess 96, lands 97 and 97' of uniform height on each side of the recess and another land 98 of greater height. When the roller is in recess 96, the valve will be in the position shown in Figure 14 wherein both ends of the cylinder of the suction motor are in communication with atmosphere. When the cam is in the position where roller 94 cooperates with either land 97 or 97', the valve will be in the position shown in Figure 7, thereby placing the forward end of the cylinder of the suction motor in communication with the manifold and the rear end in communication with atmosphere. When the cam is in the position where roller 94 cooperates with land 98, the valve will be in the position shown in Figure 6 wherein the rear end of the cylinder of the suction motor will be in communication with the manifold and the forward end in communication with atmosphere.

The hub portion of cam 95 is interlocked with the hub portion of an arm 99 also rotatably mounted upon shaft 67. The outer end of this arm is connected to a spring 100 attached to cover plate 21, thus normally biasing the arm to a horizontal position and placing the cam in a position where roller 94 cooperates with recess 96 and the valve element connects both ends of the cylinder of the suction motor to atmosphere. The body of arm 99 is formed with a slot 101 for receiving a pin 102 carried on the rear end of a link 103 positioned between the spaced members 70 and 71 of lever 69. The forward end of link 103 is connected to an arm 104 fixed to the clutch actuating shaft 5. The members forming lever 69 are so shaped as to provide converging cam surfaces 105 and 106 adjacent the pivotal axis of the lever, said surfaces extending rearwardly and meeting to form an apex 107. This apex is adapted to lie upon either one side or the other side of a horizontal line passing through the axis of the shaft, thus placing either the surface 105 or 106 for engagement with pin 102 depending upon the position of lever 69. Pin 102, prior to engagement with either surface 105 or 106, is guided in a horizontal line by slot 101 in arm 99. Each upper arm of the members forming lever 69 is provided with a notch 108 at the base of the cam surface 105 and each of the lower arms is provided with a notch 109 at the base of cam surface 106. The cam surfaces 105 and 106 cooperate with pin 102 to cause the pin to so move as to rotate cam 95 for controlling the valve and to also guide the pin into the notches 108 and 109 depending upon the position of apex 107. In order that the clutch pedal 6 and lever 104 may not be moved beyond a predetermined point, the lower end of the clutch pedal is provided with a short arm 110 for cooperation with a stop 111.

Referring to the operation of my control mechanism, when the hand lever is in the neutral position, as shown in Figure 2, the control member 40 will be in a position where none of the detents 33 and 34 are in any of the elongated recesses 43, 44, 45 and 46. The connecting devices 28 and 29 will be in their spaced apart positions as shown in Figure 5. The shifting forks will be in a position wherein the clutch element 13 is disengaged and gear 17 is out of mesh with its cooperating gears. If the clutch pedal is in engaged position as indicated by the dashed lines (Figure 1), the piston of the suction motor will be in the forward end of the cylinder and the lever 69 will be in the position shown in Figure 7. The control cam 95 for the valve 75 will be in the position shown in Figure 14 with the control arm 99 being held in a rearward horizontal position by spring 100 as shown in the same figure. Both ends of the cylinder of the suction motor will be in communication with atmosphere.

If it is now desired to place the change speed gearing in its first or low speed position, hand lever 60 is so moved as to place pin 61 in the end of the slot marked "1." As already described, this will result in the rotation of the rotatable control member 40 to a position where the projecting portion 47 on detent 33 of the connecting device 28 will be permitted to engage in the elongated recess 43. If the clutch pedal 6 is now moved forwardly, the initial movement thereof will cause the clutch to become disengaged. The pin 102 on the end of link 103 during this movement of the pedal will ride forwardly in slot 101 of the valve cam control arm 99 and no part of the valve mechanism will be operated due to the length of the slot. Continued forward movement of the clutch pedal will cause pin 102 to engage the cam surface 105 on lever 69 due to the position of apex 107 on lever 69 which is as shown in Figure 14. The pin 102 will now move along this cam surface, thereby rotating arm 99 and also the cam in a counter-clockwise direction. Rotation of the cam will cause land 97 to move beneath the roller 94 and place the valve element 77 in the position shown in Figure 7. The front end of the suction motor will now be connected to the manifold and the rear end of the suction motor will remain in communication with atmosphere. The piston of the suction motor will not be moved since the differential pressures acting thereon are tending to move it forwardly and it is already in its normal or forward end of the cylinder.

Continued forward movement of the clutch pedal will rotate the cam through an additional angle so the cam will assume the position where land 98 will engage roller 94 of the valve stem and force the valve element 77 to the position shown in Figure 6. This will cause the rear end of the suction motor to be placed in communication with the manifold and the forward end of the suction motor to be placed in communication with the atmosphere. The differential pressures now acting upon the piston of the suction motor will cause the piston to be moved to the rear end of the cylinder, thereby swinging lever 69 in a counter-clockwise direction to the position shown in Figures 1 and 6. The shaft 67 and lever 68 thereon will be moved to the position shown in Figure 4, thereby causing the connecting devices 28 and 29 to be moved to their innermost positions. When the devices have reached these positions, detent 33 of the connecting device 28 will engage in slot 36 in rod 22 under the action of spring 35, thereby connecting rod 22 to the connecting device 28.

When the cam assumes a position where roller 94 begins to cooperate with land 98, pin 102 will begin to engage in notch 108 and link 103 can apply some manual force to lever 69 to assist, if necessary, in moving the lever from the position shown in Figure 7 to the position shown in Figure 6. If the suction motor should completely fail to operate lever 69, this lever, nevertheless, can be rotated by manual force in the counter-clockwise direction to bring the connecting devices 28 and 29 to their innermost positions.

When the clutch pedal 6 is released, arm 99 and cam 95 for the valve will be rotated in a clockwise direction by the return movement of link 103 and the pulling action of spring 100. When land 97 again cooperates with roller 94, valve element 77 will assume the position shown in Figure 7. This will connect the forward end of the suction motor with the manifold and the rear end of the suction motor with the atmosphere. The differential pressures now acting upon the piston will cause the piston to move to the forward end of the cylinder, thereby swinging lever 69 from the position shown in Figures 1 and 6 to the position shown in Figure 7. This will now cause the connecting devices 28 and 29 to be moved to their outermost positions as shown in Figure 5. Since rod 22 is connected to the connecting device 28, this rod and the shifting fork 7 will be carried therewith and cause gear 17 to engage gear 18 of the gearing and place the gearing in low speed. As the clutch pedal continues its return movement, the clutch will be engaged and the valve cam arm 99 and the cam return to the positions shown in Figure 14 where roller 94 will again engage recess 96 of the cam and permit the valve to assume the position where both ends of the suction motor are in communication with the atmosphere.

If during the return movement of the clutch pedal, the suction motor should fail to operate and rotate lever 69 from the position shown in Figure 6 to that shown in Figure 7, pin 102 and arm 99 of the valve operating cam will, nevertheless, return to the position shown in Figure 14. Since lever 69 continues to remain in the position shown in Figure 6, apex 107 of the two converging cam surfaces on lever 69 will lie above the horizontal line assumed by arm 99. If now the clutch pedal should be again depressed, which is a natural movement for the operator when he realizes that the desired gear has not become engaged, pin 102 will be moved forwardly and engage cam surface 106. This cam surface will cause the pin to be guided into notch 109 and provide a direct mechanical connection between link 103 and the lower arm of the lever. Continued forward movement of the clutch pedal will now cause manual force to be applied to lever 69 and thus rotate the lever in a clockwise direction to cause it to assume the position shown in Figure 7 wherein gear 17 will be moved to operative position in a manner already described.

It is also to be noted that as the clutch pedal is again moved forwardly when the operator becomes conscious that the selected gear has not been made operative, pin 102 will also cause arm 99 for the valve cam to be rotated in a clockwise direction. This will result in land 97' to cooperate with roller 94 and move the valve to the position shown in Figure 7. The forward end of the suction motor will thus be placed in communication with the manifold and the rear of the suction motor will be placed in communication with atmosphere. Thus, if there is any differential force acting upon the piston of the suction motor, it will be effective in assisting the manual force being applied by the operator to rotate the lever 69 in a clockwise direction to cause it to assume the position shown in Figure 7.

If it is now desired to place the change speed gearing in second speed position, the hand lever beneath the steering wheel is moved to a position where pin 61 is in the end of the slot marked "2". The rotatable member 40 will now be moved to a position where the elongated recess 45 will cooperate with the projection 47 on detent 33 of the connecting device 29. This rotation of the rotatable control member will also cause detent 33 of the connecting device 28 to be disengaged from slot 36 on rod 22. If now the clutch pedal is again disengaged, the connecting devices 28 and 29 will be brought to their central positions as shown in Figure 4 by the operation of the suction motor in a manner already described, thereby disengaging gear 17. If said suction motor fails, manual force may be applied to the lever through link 103 and pin 102, the latter engaging in notch 108 of lever 69. The inward movement of connecting devices 28 and 29 will cause the shifting fork 24 to be moved again to an inoperative position since plate 30 of connecting device 28 will abut the hub of this fork and carry it to said inoperative position, notwithstanding the fact that detent 33 has become disengaged from slot 36. When connecting devices 28 and 29 assume their inner positions, detent 33 will engage in slot 39 on rod 23. As the clutch pedal is again released to engage the clutch, the suction motor will be operated in a manner already described to rotate lever 69 to the position shown in Figure 7, thereby causing the connecting devices 28 and 29 to be moved to their outer positions, the connecting device 29 carrying with it rod 23 and shifting fork 25. This will cause the clutch element 13 to connect gear 15 to driven shaft 9, thereby causing second speed ratio to be operative. If during the return movement of the clutch pedal the suction motor should fail to perform the shifting of devices 28 and 29 apart, a subsequent downward movement of the clutch will result in the shift being made by manual force or by a manual force and a force derived from the suction motor in the manner already described.

If the transmission is desired to be placed in high speed position, hand lever 60 is moved so pin 61 is in the end of the slot marked "3." The rotation of the rotatable control member 40 will now cause detent 33 to be disengaged from slot 39 in rod 23 and the elongated recess 44 placed in a position to receive projection 48 on detent 34 of connecting device 28. Downward movement of the clutch pedal will now cause the connecting devices 28 and 29 to be moved to their inner positions, plate 30 of the connecting device 29 carrying with it the shifting fork 25 to thus disengage the clutch element 13 from the clutch teeth of the second speed gear 15. When the connecting devices 28 and 29 reach their innermost positions, as shown in Figure 4, detent 34 of device 28 will engage in slot 38 of rod 23, thus connecting the rod to said connecting device. When the clutch pedal is released, the connecting devices 28 and 29 will be moved to their outermost positions, device 28 carrying with it rod 23 and thereby moving shifting fork 25 to a position where the clutch element 13 will directly connect shaft 8 of the gearing to driven shaft 9, thus causing high speed to be operative.

When reverse speed is desired, hand lever 60 is placed in a position where pin 61 is in the end of the slot marked "R." This will place the rotatable control member 40 in a position where projection 48 on detent 34 of connecting device 29 will be able to cooperate with the elongated recess 46. The other detents will be moved to inoperative positions. Downward movement of the clutch pedal will result in the connecting devices 28 and 29 being moved to their inner positions where detent 34 of connecting device 29 will engage in slot 37 of rod 22. Return movement of the clutch pedal will cause the connecting devices 28 and 29 to be moved to their outer positions and the shifting fork 24 carried with the connecting device 29 to a position where gear 17 will be in mesh with the idler gear 19 to cause reverse speed to be operative.

From the foregoing description it is apparent that I have produced a very simple and efficient control mechanism for a change speed gearing whereby any gear ratio can be selected by a movement of the hand lever and this gear ratio caused to be operative by movement of the clutch pedal which conforms with the clutch engaging and disengaging movements of said pedal. Any gear ratio of the change speed gearing may be selected at any time regardless of whether the gearing is in neutral or in a gear ratio operative position. The shifting of the gears is normally performed by power, thus not placing any additional strain upon the leg of the operator. However, the construction is such that in the event the shifting of the gear or clutch is not accomplished by the suction motor, the shift may, nevertheless, be made by manual force or manual force may be employed to assist the suction motor to make the shift. The gearing is always neutralized on the down stroke of the clutch pedal, notwithstanding the failure of the power means for performing the shifting operation since the clutch pedal will be directly connected to the gear shifting mechanism as soon as the control valve is moved to an operative position.

The arrangement is also such that if the shifting of the selected gear to an operative position is not performed by the suction motor as a result of the return stroke of the clutch pedal to a clutch-engaged position, then a subsequent downward stroke of the clutch pedal will result in the shift being made by manual force. This is a very important feature of my invention since the method of operation follows the operator's natural actions when the shift is not made by means of the suction motor. The natural thing to do when something fails is to try to do it over again. Thus, when the operator becomes conscious of the fact that the return movement of the clutch pedal has failed to cause the selected gear ratio to become operative, his first action is to push the clutch pedal down again and then allow it to return. This subsequent downward movement of the clutch pedal is employed to permit the operator to apply manual force to the member being shifted. The control of the valve is such that it will always tend to cause the suction motor to assist the manual force employed to shift the gearing elements. Thus, the operator will never be called upon to do all the gear shifting by manual force unless the suction motor is totally inoperative.

My novel control mechanism is also readily attached to the presently used change speed gearing either as an accessory or as standard equipment. When so applied, the same gear shifting forks and rods may be employed, it only being necessary to cut the required notches in the rods.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In control mechanism for a change speed gearing having a shifting fork for controlling different speeds thereof, a rod for moving the fork, two devices mounted for longitudinal sliding movement in opposite directions, each of said devices comprising two spaced plates through which the rod extends, a pivotally mounted detent positioned between the plates of each device, a spring for biasing each detent toward an operative position, means forming notches in the rod for receiving the detents, a rotatable control member fixed against axial movement, means on said control member and the detents for selectively permitting the detents to engage the notches, and means for simultaneously moving the devices in opposite directions.

2. In control mechanism for a change speed gearing having a shiftable element for controlling different speeds thereof, two members mounted for longitudinal sliding movement in opposite directions, detachable connecting means carried by the members for connecting either member to said shiftable element so that either member can move the shiftable element therewith in both directions, means comprising a rotatable member for selectively causing said detachable connecting means to be conditioned for operation or to be inoperable by a rotation thereof in any position of the members, said members when moved longitudinally having relative movement with respect to the rotatable member, and means for simultaneously moving said members in opposite directions.

3. In control mechanism for a change speed gearing having a shifting fork for controlling different speeds thereof, a rod for moving the fork, two members associated with said rod for longitudinal sliding movement in opposite directions, means comprising spring-biased detents carried by the members for connecting them to the rod, means comprising a rotatable member positioned adjacent the members and provided with means thereon directly engaging with parts of the detents for selectively causing the detents to be conditioned for operation or to be inoperable in any position of the members, and means for moving said members in opposite directions.

4. In control mechanism for a change speed gearing having two shiftable elements for controlling different speeds thereof, two members mounted on the shiftable elements in axially spaced relation for longitudinal sliding movement, means comprising two detents pivotally mounted on each member for connecting said members to either of said shiftable elements, a rotatable member fixed against longitudinal movement with its axis extending in the direction of sliding movement of the members and being provided with elongated recesses for selectively receiving parts of the detents and causing said detents to be conditioned for operation in any position of the members, and means for simultaneously moving said members in opposite directions.

5. In control mechanism for a change speed gearing having two parallel shiftable rods, shifting forks on the rods for controlling the different speeds thereof, two members mounted on the rods for longitudinal sliding movement only, means comprising detents pivoted on said members and cooperating notches in the rods for selectively connecting said members to either of said rods, means comprising a rotatable member positioned between and parallel with the rods and provided with longitudinal recesses and ridges cooperating with the detents for controlling said detents, said members when moved longitudinally having relative movement with respect to the rotatable member, and means for simultaneously moving said members in opposite directions.

6. In control mechanism for a change speed gearing having a shifting fork for controlling different speeds thereof, a rod for moving the fork, two members mounted in juxta-position to the rod for longitudinal sliding movement in opposite directions, means comprising detents pivotally carried by the members for connecting either member to said rod, a rotatable selector rod positioned parallel to said rod and fixed against axial movement, means on the rotatable selector rod directly cooperating with the detents for selectively controlling the conditioning of the detents for operation or the placing of the detents in an inoperative position by a rotation only of the rotatable selector rod in any position of the members, and means for simultaneously moving said members in opposite directions.

GLENN T. RANDOL.